United States Patent
Lu et al.

(10) Patent No.: US 6,804,859 B2
(45) Date of Patent: Oct. 19, 2004

(54) SECURING DEVICE FOR A LAPTOP COMPUTER HINGE TO AVOID DAMPING OF A SCREEN WHEN THE SCREEN IS AWAY FROM MAINFRAME OF THE LAPTOP COMPUTER

(75) Inventors: Sheng-Nan Lu, Shulin (TW); Chung-Yu Lee, Shulin (TW)

(73) Assignee: Shin Zu Shing Co., Ltd., Taipei (TW)

( * ) Notice: Subject to any disclaimer, the term of this patent is extended or adjusted under 35 U.S.C. 154(b) by 0 days.

(21) Appl. No.: 10/339,932

(22) Filed: Jan. 10, 2003

(65) Prior Publication Data

US 2004/0134032 A1 Jul. 15, 2004

(51) Int. Cl.⁷ ............................................... E05D 11/08
(52) U.S. Cl. .............................. 16/342; 16/337; 16/382
(58) Field of Search .......................... 16/342, 337, 340, 16/374, 382, 390; 361/680, 681–683; 403/119–120, 111, 116, 84; 248/291.1, 292.12, 292.13, 292.14, 447, 457, 458, 917–923

(56) References Cited

U.S. PATENT DOCUMENTS

| | | | | |
|---|---|---|---|---|
| 4,365,385 A | * | 12/1982 | Gotoh ......................... | 16/382 |
| 5,406,678 A | * | 4/1995 | Kaden et al. .................. | 16/342 |
| 5,467,504 A | * | 11/1995 | Yang ............................ | 16/342 |
| 5,473,794 A | * | 12/1995 | Kobayashi .................... | 16/337 |
| 5,653,001 A | * | 8/1997 | Lane ............................ | 16/340 |
| 6,018,847 A | * | 2/2000 | Lu ............................... | 16/337 |
| 6,430,777 B1 | * | 8/2002 | Lu ............................... | 16/340 |

FOREIGN PATENT DOCUMENTS

| | | | | | |
|---|---|---|---|---|---|
| JP | 2003254323 A | * | 9/2003 | ........... | E05D/11/08 |
| JP | 2003269437 A | * | 9/2003 | ........... | E05D/11/08 |

* cited by examiner

Primary Examiner—Chuck Y. Mah
(74) Attorney, Agent, or Firm—William E. Pelton, Esq.

(57) ABSTRACT

A securing device includes a body adapted to securely connect to the primary plate and two arms vertically extending out from two opposite ends of the body. Each of the arms has an assembly hole to adapt to align with opposite ends of a tubular connector of the primary plate so that when the shaft extends into the tubular tube, the two arms are secured to the shaft. When a radial force is acting on the shaft, the force is compromised by the two arms of the securing device such that damping of the screen is minimized.

2 Claims, 5 Drawing Sheets

SECURING DEVICE FOR A LAPTOP COMPUTER HINGE TO AVOID DAMPING OF A SCREEN WHEN THE SCREEN IS AWAY FROM MAINFRAME OF THE LAPTOP COMPUTER

BACKGROUND OF THE INVENTION

1. Field of the Invention

The present invention relates to a securing device, and more particularly to a securing device for a laptop computer hinge to avoid damping of a screen when the screen is away from a mainframe of the laptop computer.

2. Description of Related Art

A hinge for a laptop computer enables the screen to pivot relative to the mainframe. When the screen is opened, the hinge also helps to position the screen at a specific required position such that the operator is able to watch the screen at any angle. However, when the operator is raising the screen, damping of the screen caused by the hinge happens if the operator suddenly lets go the screen. The damping easily wears the shaft in the hinge and thus the life span of the hinge is shortened.

To have a better understanding of how the conventional hinge causes the damping to aggravate the wear of the shaft, embodiment shown in FIG. 5 explains the design defect in greater detail.

A laptop hinge (16) is composed of a primary plate (162) adapted to be securely connected to a mainframe (10) of a laptop computer and a secondary plate (166) pivotally connected to the primary plate (162) via a shaft (168) extending between the primary plate (162) and the secondary plate (166). The secondary plate (166) is adapted to securely connect to a screen (12) of the laptop computer. Thus, when the screen (12) is raised, a sudden damping in the radial direction of the shaft is generated due to the material of both the primary plate (162) and the secondary plate (166).

Furthermore, because both ends of the primary plate (162) are free of any securing element, any force exerted on the primary plate (162) will easily cause both ends of the primary plate (162) to damp. This is somewhat like a sheet of paper, which is quite easy to be deformed if opposite sides of the paper are experiencing forces coming from different directions, the paper is easily deformed or torn. However, if opposite sides of the paper is secured, forces coming from different directions and exerted on the paper will have to overcome the securing element to deform the paper. Based on this theory, if a securing device is applied to secure opposite ends of the primary plate, damping of the primary plate is minimized and thus the life span of the hinge is prolonged.

To overcome the shortcomings, the present invention tends to provide an improved securing device for a laptop computer hinge to mitigate and obviate the aforementioned problems.

SUMMARY OF THE INVENTION

The primary objective of the present invention is to provide an improved securing device for a laptop computer hinge to minimize the damping of the primary plate of the laptop computer hinge so as to prolong the life span of the laptop computer hinge.

Other objects, advantages and novel features of the invention will become more apparent from the following detailed description when taken in conjunction with the accompanying drawings.

DETAILED DESCRIPTION OF THE PREFERRED EMBODIMENT

Figure 1:
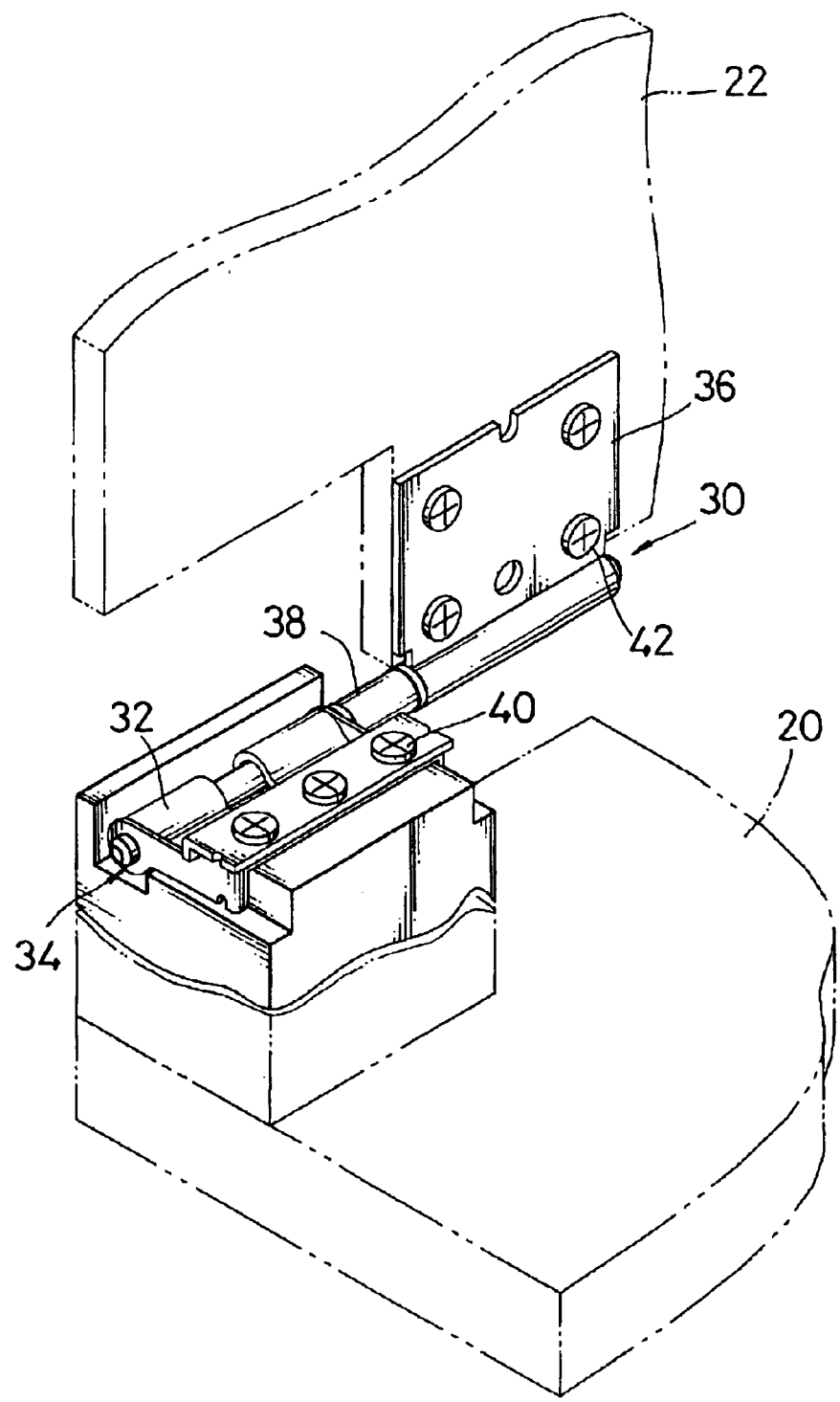
FIG. 1 is a perspective view of the securing device adapted to a laptop computer hinge.
Figure 2:
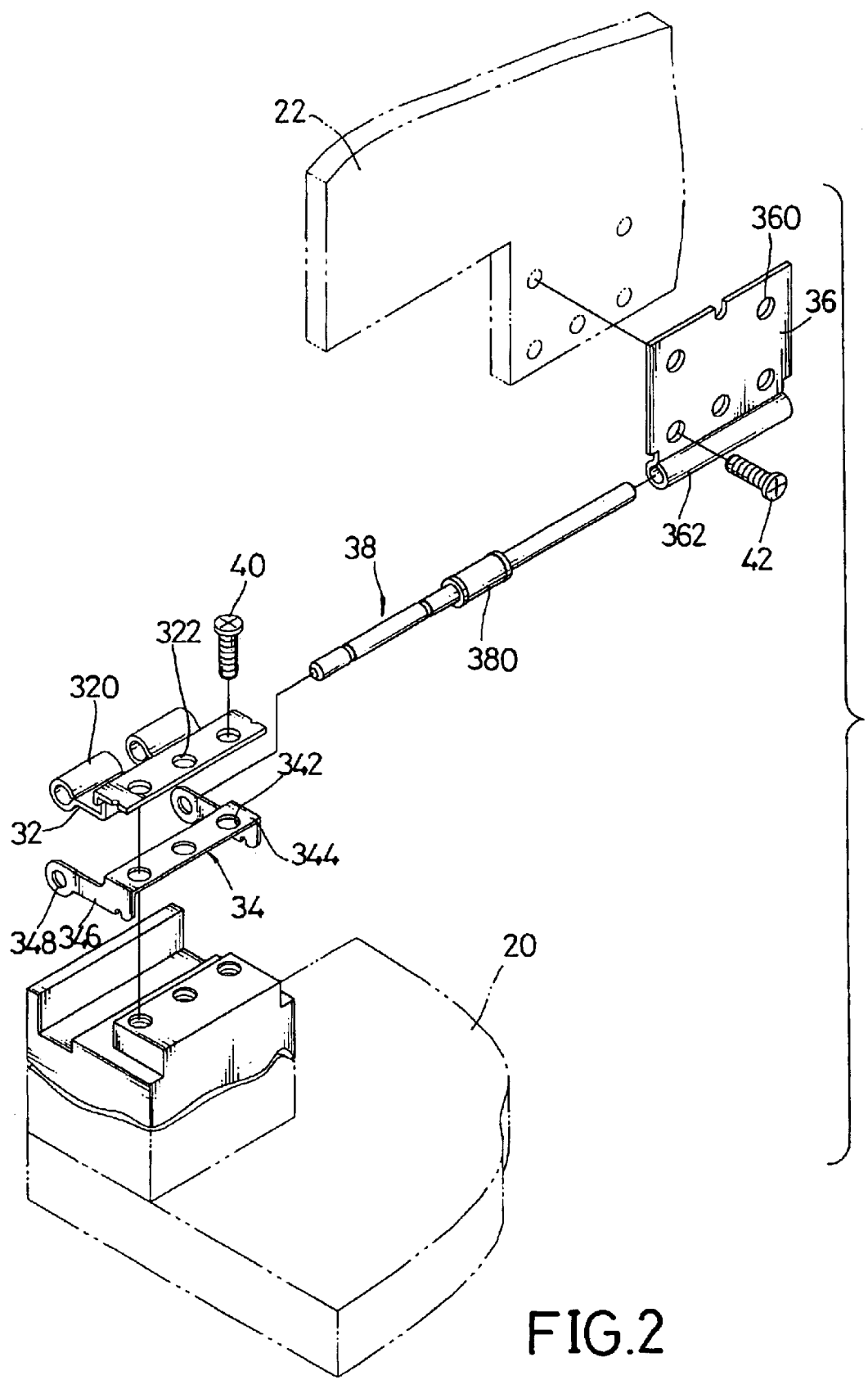
FIG. 2 is an exploded perspective view of the laptop computer hinge of the present invention.

With reference to FIGS. 1 and 2, the laptop computer hinge (30) in accordance with the present invention includes a primary plate (32), a securing device (34), a secondary plate (36) and a shaft (38).

The primary plate (32) is adapted to securely connect to a mainframe of a laptop computer and has at least one (two are shown in this embodiment) tubular connector (320) formed on one side of the primary plate (32) and through holes (322) defined through the primary plate (32).

The securing device (34) has a body (344) and two arms (346) respectively formed on two opposite ends of the body (344). The body (344) has holes (342) corresponding to the through holes (322) of the primary plate (32). Each of the arms (346) has an assembly hole (348) corresponding to opposite ends of the tubular connector (320).

The secondary plate (36) is adapted to securely connect to a screen (22) of the laptop computer and has a tube (362) formed on one side of the secondary plate (36) and multiple apertures (360) formed on the secondary plate (36).

The shaft (38) has a mediate portion (380) with an outer diameter larger than an inner diameter of the at least one tubular connector (320) and an inner diameter of the tube (362).

When the laptop computer hinge of the present invention is assembled, the primary plate (32) is superposed on top of the body (344) of the securing device (34) and the through holes (322) communicate with the holes (342). Meanwhile the two assembly holes (348) of the two arms (346) correspond to opposite ends of the at least one tubular connector (320). Then opposite ends of the shaft (38) respectively extend into the at least one tubular connector (320) as well as the assembly holes (348) of the securing device (34) and the tube (362) of the secondary plate (36) to connect the primary plate (32) to the secondary plate (36). Then, first screws (40) extend through the aligned through holes (322) and the holes (342) and into a mainframe (20) to securely combine the primary plate (32) and the body (344) of the securing device (34) and to mount the combination of the primary plate (32) and the securing device (34) on the mainframe (20).

Second screws (42) extend through the apertures (360) of the secondary plate (36) to securely connect the secondary plate (36) to the screen (22) of the laptop computer.

Figure 3:
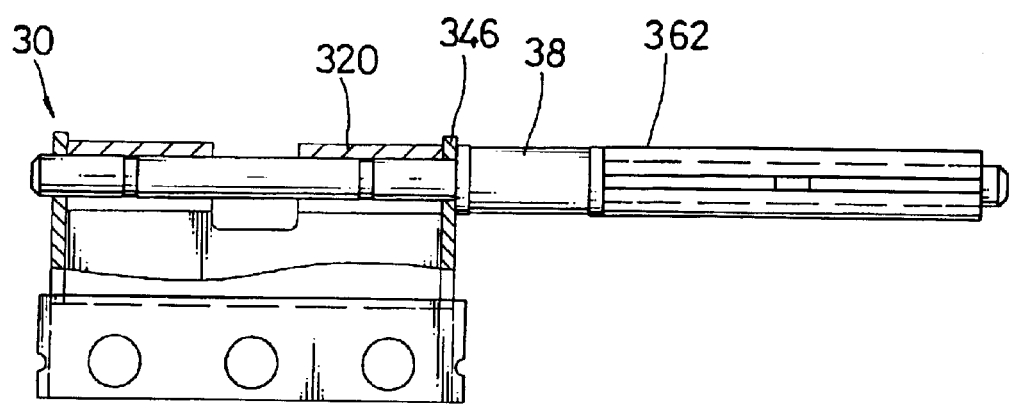
FIG. 3 is a plan view showing the assembled laptop computer hinge.
Figure 4:
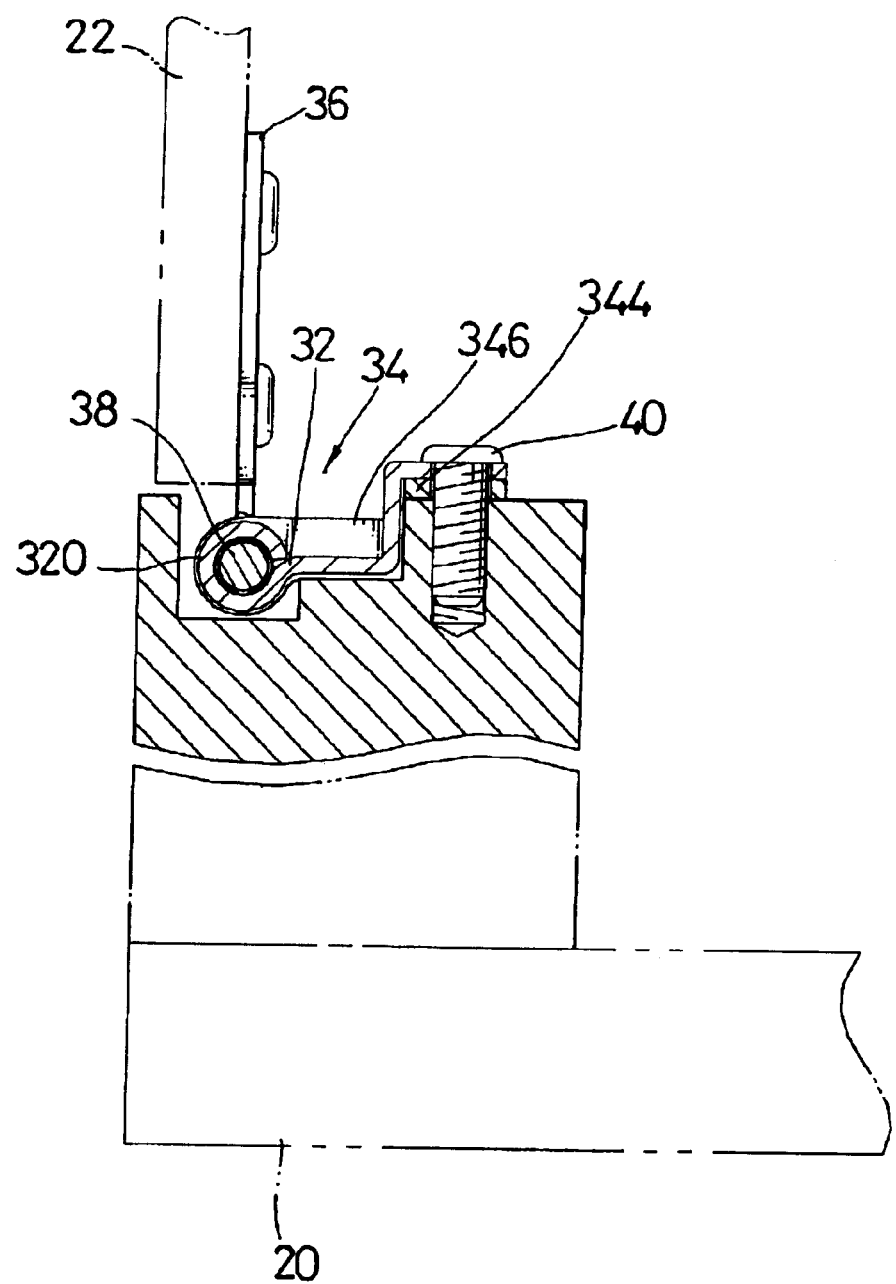
FIG. 4 is a schematic view of the assembled laptop computer hinge in partial section.
Figure 5:
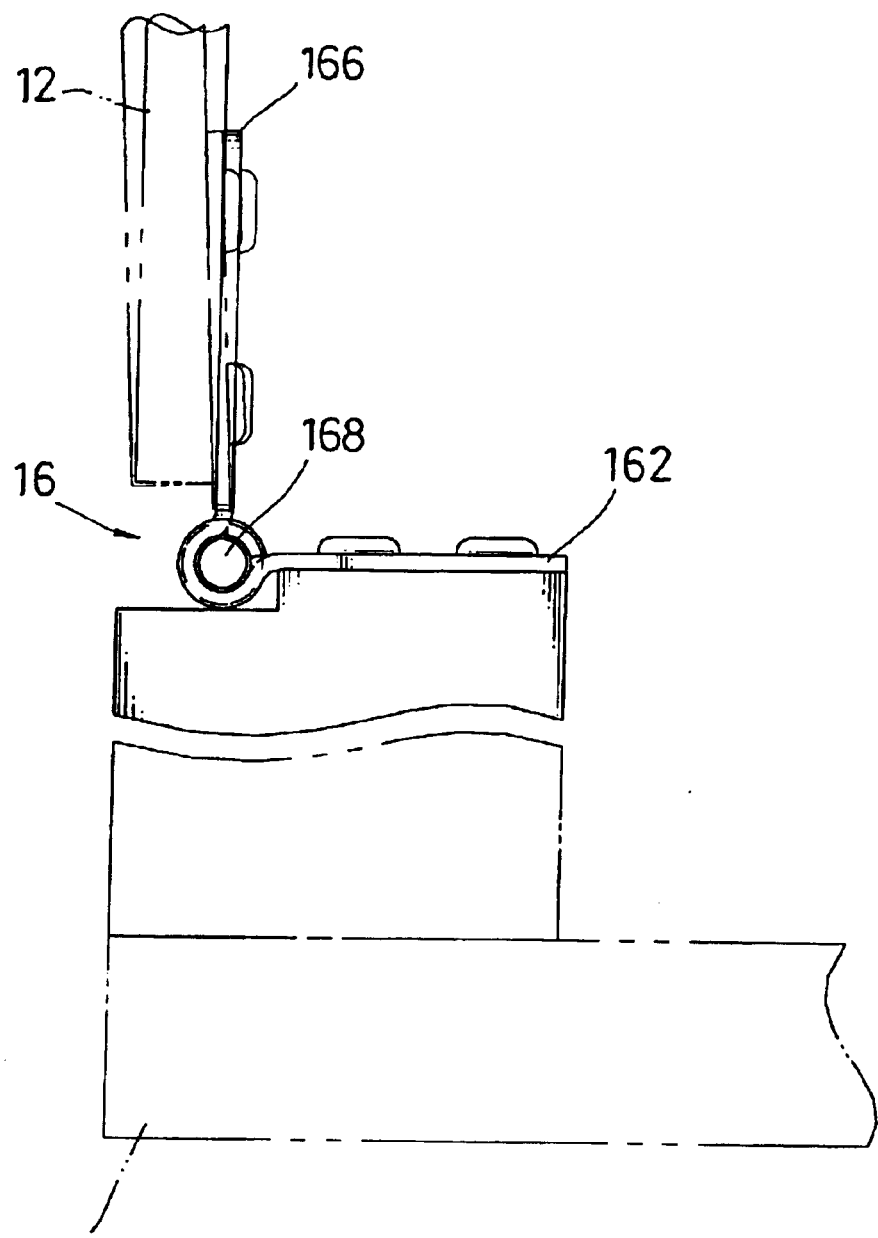
FIG. 5 is a schematic view of a conventional laptop computer hinge.

With reference to FIGS. 3 and 4, after the laptop computer hinge of the present invention is assembled and respectively connected to the mainframe (20) and the screen (22), it is noted that when the screen (22) pivots relative to the mainframe (20), longitudinal force is applied on the shaft (38), which causes the primary plate (32) to damp. However, because the body (344) is securely connected to the primary plate (32) and the arms (346) extend vertically with respect to the body (344) as well as the primary plate (32) and are secured to the shaft (38), a securing force is applied to the radial direction of the shaft (38), such that damping effect of the laptop computer hinge is minimized. Therefore when the screen (22) is raised, damping to the screen (22) is greatly reduced.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A securing device for a laptop computer hinge having a primary plate adapted to securely connect to a mainframe of a laptop computer and a secondary plate pivotally connected to the primary plate via a shaft to be adapted to connect to a screen of the laptop computer, the securing device comprising:

a body adapted to securely connect to the primary plate; and two arms extending respectively from opposite ends of the body and each having an assembly hole, said assembly holes being adapted for respective alignment with opposite ends of a tubular connector formed on one side of the primary plate so that when the shaft extends into the tubular connector, the two arms are secured to the shaft, whereby a force acting on the shaft is compromised by the two arms of the securing device such that damping of the screen is minimized.

2. The securing device as claimed in claim 1, wherein the body has holes defined to adapt to align with through holes in the primary plate such that when the primary plate is secured on the mainframe, the body of the securing device is secured.

* * * * *